United States Patent
Huang (10) Patent No.: US 6,694,420 B2
(45) Date of Patent: Feb. 17, 2004

(54) ADDRESS RANGE CHECKING CIRCUIT AND METHOD OF OPERATION

(75) Inventor: Lun Bin Huang, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 179 days.

(21) Appl. No.: 10/008,726

(22) Filed: Dec. 5, 2001

(65) Prior Publication Data

US 2003/0120888 A1 Jun. 26, 2003

(51) Int. Cl.[7] .......................... G06F 12/06; G06F 12/00
(52) U.S. Cl. ...................... 711/200; 711/220; 711/132; 711/219
(58) Field of Search ........................ 711/220, 211, 711/132, 219, 200

(56) References Cited

U.S. PATENT DOCUMENTS

| | | | | |
|---|---|---|---|---|
| 4,627,017 A | * | 12/1986 | Blount et al. ................ | 711/212 |
| 5,784,713 A | * | 7/1998 | McMahan .................... | 711/220 |
| 6,510,507 B1 | * | 1/2003 | Matt et al. ................... | 711/206 |

FOREIGN PATENT DOCUMENTS

| EP | 1150203 | * 10/2001 |
|---|---|---|

\* cited by examiner

*Primary Examiner*—Glenn Gossage
(74) *Attorney, Agent, or Firm*—Lisa K. Jorgenson; Willam A. Munck (57) ABSTRACT

An address range checking circuit capable of determining if a target address, A[M:0], is within an address space having $2^N$ address locations beginning at a base address location, B[M:0], is disclosed, wherein the address range checking circuit does not require a large comparator circuit. The address range checking circuit comprises: 1) comparison circuitry for determining if the address segment A[N−1:0] is less than the address segment B[N−1:0] and generating on a first control signal; 2) first equivalence detection circuitry for determining if the address segment A[M:N] is equal to the address segment B[M:N] and generating an A=B status signal; 3) second equivalence detection circuitry for determining if the address segment A[M:N] is equal to the address segment B[M:N] plus one and generating an A=B+1 status signal; and 4) a multiplexer that outputs the A=B status signal or the A=B+1 status signal depending on the value of the first control signal.

23 Claims, 3 Drawing Sheets

ADDRESS RANGE CHECKING CIRCUIT AND METHOD OF OPERATION

TECHNICAL FIELD OF THE INVENTION

The present invention is directed, in general, to data processing systems and, more specifically, to a circuit and method for determining if an address is within the address range of a stack cache.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of a pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution advantage rate that a pipelined processor has over a non-pipelined processor.

A multi-stage processor pipeline may consist of an instruction fetch stage, a decode stage, an operand fetch stage, and an execute stage, among others. In addition, the processor may have an instruction cache that stores program instructions for execution, a data cache that temporarily stores data operands that otherwise are stored in processor memory, and a register file that also temporarily stores data operands.

Figure 5:
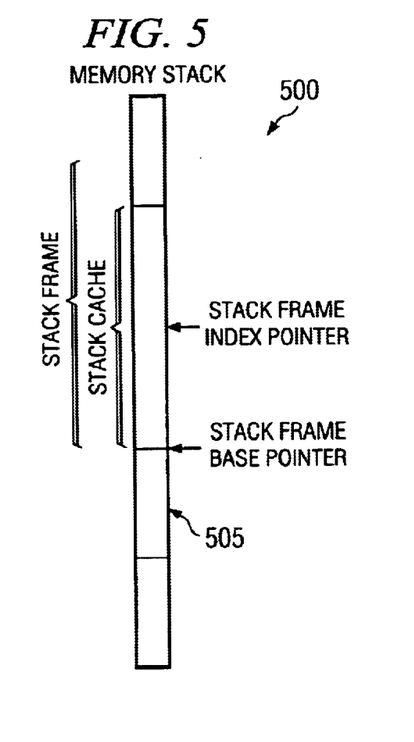
FIG. 5 illustrates an exemplary stack frame in a portion of the memory stack.

In a stack-based microprocessor system, the variables, arguments and processor status may be stored in a portion of memory called the stack frame. A stack frame base pointer contains the address of the root location of the current stack frame, while a stack frame index pointer contains the address of the exact memory location of the byte or word, as shown in FIG. 5. FIG. 5 illustrates an exemplary stack frame in a portion of the memory stack. The processor accesses the stack frame frequently, using the index pointer or sometimes using an absolute pointer. In the case of an index pointer, the absolute address can be calculated by adding the base pointer and the index pointer.

In high performance computer systems, it is desirable to maintain portion of the current stack frame in a very small but fast register cache, in order to speed up the access to the otherwise slower large L1 or L2 cache, or the even slower off-chip main memory. For example, a program can setup a stack frame base pointer register and use an index pointer to access a memory location. If a data processor implements a stack cache and ensures that the base of the cache corresponds to the base pointer, the memory value can be addressed simply by indexing, as if it is read from a register file. Normally a valid status bit is used to indicate the validity of a given entry in the cache.

However, in such designs, maintaining the data coherence between the stack cache and the slower memory that it mirrors has proved to be a critical issue. Take the following program sequence as an example: 1) store a value to absolute location A; 2) read a memory location using base pointer B and index C. A high performance machine would normally fetch the memory location indexed by C from the stack cache before executing the store operation. This is so because the store operation has to wait for the data operand from an execution stage, which is usually near the end of the pipeline. The processor can fetch the value indexed by index C from stack cache quickly. However, it has to also make sure that the store operation does not make the data stale (i.e., if A=B+C). A typical approach employed by many designs is to compare the absolute address A with the range of addresses in cache and invalidate the entry by resetting the valid status bit if there is a match, thereby forcing a cache miss and maintaining the integrity of the cache data.

Invalidation of the stack cache valid bits has proved to be a critical timing issue in a high-speed design. In a typical implementation, the data processor subtracts the base address B from the absolute store address A and invalidates an entry using the lower bits of the difference if the high order bits of the result are zero. For example, for a 16-entry cache, the twenty-eight (28) most significant bits, D[31:4], of the difference, assuming a 32-bit address space, must be zero if address A is cached in the stack cache. Unfortunately this approach is slow because it relies on the result of a relatively large and slow adder that is normally used to do the subtraction. In addition to its speed problems, the adder also requires a large amount of chip space.

Therefore, there is a need in the art for an improved data processor that more rapidly invalidates an entry in the stack cache. In particular, there is a need in the art for improved address rang check circuitry for invalidating an entry in the stack cache.

SUMMARY OF THE INVENTION

To address the above-discussed deficiencies of the prior art, it is a primary object of the present invention to provide an address range checking circuit capable of determining if a target address, A[M:0], is within an address space having $2^N$ address locations beginning at a base address location, B[M:0], wherein the address range checking circuit does not require a large comparator circuit.

According to an advantageous embodiment of the present invention, the address range checking circuit comprises: 1) comparison circuitry capable of determining if the address segment A[N−1:0] is less than the address segment B[N−1:0] and generating on an output a first control signal having a first logic state indicating A[N−1:0] is less than B[N−1:0] and having a second logic state indicating A[N−1:0] is not less than B[N−1:0]; 2) first equivalence detection circuitry capable of determining if the address segment A[M:N] is equal to the address segment B[M:N] and generating on an output an A=B status signal having a first logic state indicating A[M:N] is equal to B[M:N] and having a second logic state indicating A[M:N] is not equal to B[M:N]; 3) second equivalence detection circuitry capable of determining if the address segment A[M:N] is equal to the address segment B[M:N] plus one and generating on an output an A=B+1 status signal having a first logic state indicating A[M:N] is equal to B[M:N] plus one and having a second logic state indicating A[M:N] is not equal to B[M:N] plus one; and 4) a multiplexer controlled by the first control signal generated by the comparison circuitry, the multiplexer having a first input coupled to the first equivalence detection circuitry output and a second input coupled to the second equivalence detection circuitry output, wherein the first control signal causes the multiplexer to output the A=B status signal when the first control signal is at the second logic state indicating A[N−1:0] is not less than B[N−1:0] and causes the multiplexer to output the A=B+1 status signal when the first control signal is at the first logic state indicating A[N−1:0] is less than B[N−1:0].

According to the principles of the present invention, the comparison circuit in the address range checking circuit compares only a small number, N, of the least significant bits of the addresses A[M:0] and B[M:0], so that N is much smaller than M. This allows the comparison circuit to be very fast compared to a comparator circuit that compared all of the address bits in the addresses A[M:0] and B[M:0].

According to one embodiment of the present invention, the second equivalence detection circuitry comprises M−N+1 inverters, each of the M−N+1 inverters receiving and inverting one of the address bits in the address segment B[M:N].

According to another embodiment of the present invention, the second equivalence detection circuitry further comprises M−N+1 carry-save adders, each of the M−N+1 carry-save adders having a first input for receiving one of the address bits in the address segment A[M:N], A, a second input for receiving a corresponding one of the inverted B[M:N] address bits, B', and a carry-in (CI) input for receiving a carry-in value equal to 1, and wherein each of the M−N+1 carry-save adders generates a sum (S) output and a carry-out (CO) output, such that each of the M−N+1 carry-save adders has the following truth table:

| A | B' | CI | CO | S |
|---|---|---|---|---|
| 0 | 1 | 1 | 1 | 0 |
| 0 | 0 | 1 | 0 | 1 |
| 1 | 1 | 1 | 1 | 1 |
| 1 | 0 | 1 | 1 | 0 |

According to still another embodiment of the present invention, the second equivalence detection circuitry further comprises M−N+1 exclusive-OR gates, wherein each of the M−N most significant exclusive-OR gates has a first input coupled to the sum output of the Kth one of the M−N most significant carry-save adders and has a second input coupled to the carry-out output of the (K−1)th one of the M−N most significant carry-save adders and wherein the least significant exclusive-OR gate has a first input coupled to the sum output of the least significant carry-save adder and a second input coupled to a Logic 0.

According to yet another embodiment of the present invention, the second equivalence detection circuitry further comprises an AND gate having M−N+1 inputs, each of the M−N+1 AND gate inputs coupled to one of the M−N+1 outputs of the M−N+1 exclusive-OR gates, wherein an output of the AND gate comprises the A=B+1 status signal.

As noted above, the address range checking circuit is fast because it does not require a large comparator circuit and relies on equivalence detection circuits. Accordingly, in an address range checking circuit according to the principles of the present invention, the value of M is much larger than N.

In one embodiment of the present invention, M is at least 15 and N is less than 8.

In another embodiment of the present invention, M is at least 31 and N is less than 8.

In still another embodiment of the present invention, M is at least 31 and N is less than 6.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Although the circuit and method presented in this disclosure are used in connection with the speed-up of the invalidation of a stack cache with minimum logic, the present invention can be utilized in any design where a fast determination of a given address hitting a range of sequential addresses with a given starting (base) address is desired. A stack cache is merely one useful embodiment of the present invention.

Figure 1:
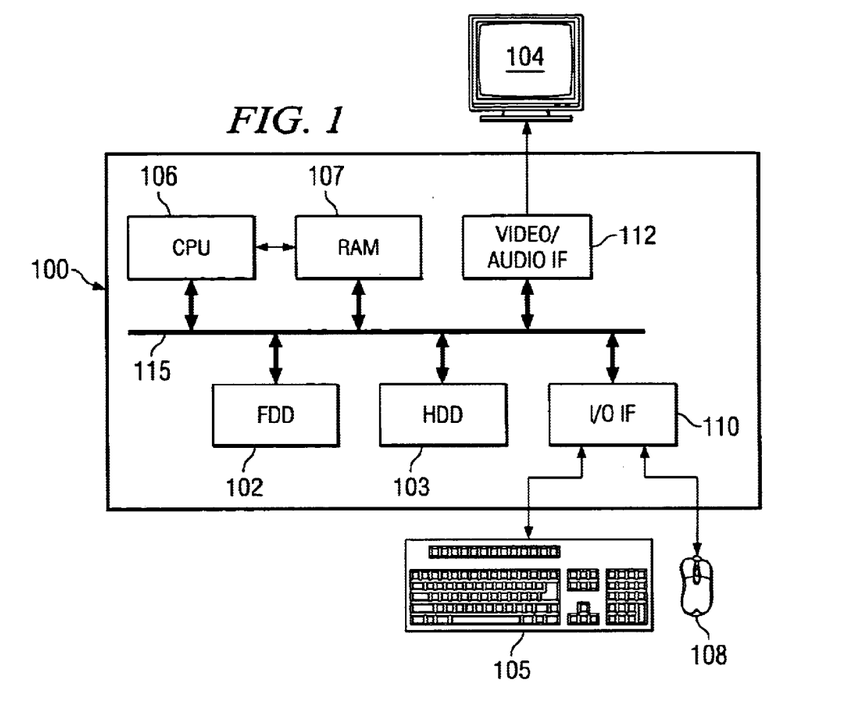
FIG. 1 illustrates an exemplary processing system (i.e., a personal computer), that contains an address range checking circuit according to an exemplary embodiment of the present invention.

FIG. 1 illustrates an exemplary processing system, namely personal computer (PC) 100, that contains an address range checking circuit in accordance with the principles of the present invention. Personal computer 100 comprises removable (i.e., floppy) disk drive 102 and hard disk drive 103, monitor 104, keyboard 105, processor (CPU) 106, main memory 107, and a pointing device, such as mouse 108. Monitor 104, keyboard 105, and mouse 108 may be replaced by, or combined with, other input/output (I/O) devices. Removable disk drive 102 is capable of reading and writing to removable floppy diskettes. Hard disk drive 105 provides fast access for storage and retrieval of application programs and data.

Keyboard 105 and mouse 108 are coupled to PC 100 via input/output (I/O) interface (IF) 110. Monitor 104 is coupled to PC 100 via video/audio interface (IF) 112. The internal components of PC 100, including floppy disk drive 102, hard disk drive 103, processor 106, main memory 107, I/O interface 110 and video/audio interface 112, are coupled to and communicate across communications bus 115.

In an exemplary embodiment of the present invention, main memory 107 comprises a volatile storage device, such as a dynamic random access memory (RAM). Processor 106 may comprise an on-board two level cache system, including a Level 1 (L1) cache and a Level 2 (L2) cache. The two level cache is a system in which a small, fast cache (the L1 cache) is connected to a slower, larger cache (the L2 cache). When the central processing unit (CPU) core logic of processor 106 reads or writes data to or from a memory location in main memory 107, the cache system first tests to see if the data belonging to that location is in the L1 cache. If the data is in the L1 cache, then the data is provided or updated quickly by the L1 cache. If the data is not in the L1 cache, then an L1 cache read "miss" or an L1 cache write "miss" has occurred.

The data is then provided or updated to the CPU core logic of processor 106 by the L2 cache. In the case of an L1 cache read miss, the line containing the requested data is also transferred from the L2 cache to the L1 cache, so that the data may be provided more quickly the next time processor 106 accesses the data. This is known as an L1 cache line fill. If the data is also not in the L2 cache, then an L2 cache miss has occurred and the line containing the requested data is fetched from main memory 107 and then loaded into the L2 cache for faster access the next time the data is requested. This is known as an L2 cache line fill.

Figure 2:
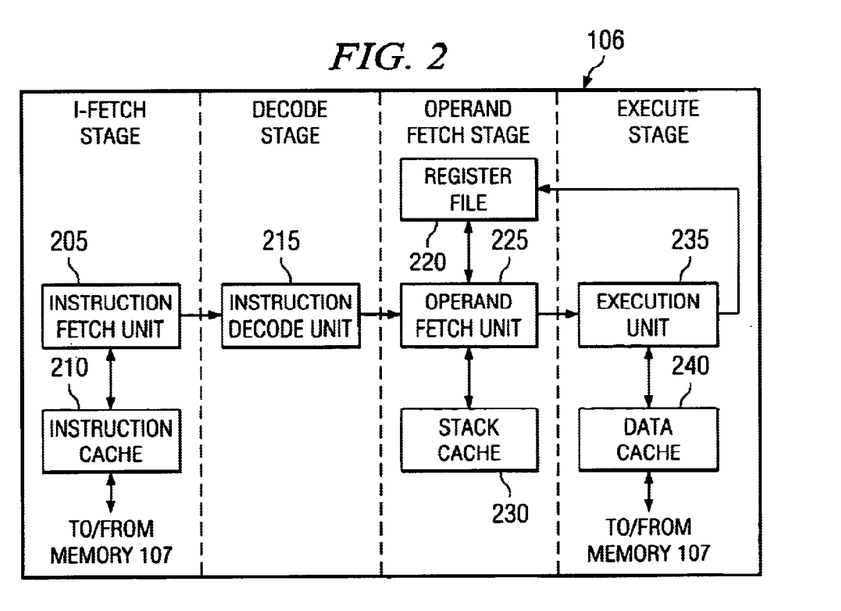
FIG. 2 illustrates an exemplary pipelined data processor in which an address range checking circuit according to the principles of the present invention may be implemented.

FIG. 2 illustrates exemplary data processor 106 in greater detail according to the principles of the present invention may be implemented. Data processor 106 comprises an instruction fetch (I-fetch) stage, a decode stage, an operand fetch stage, and an execute stage, among others. The instruction fetch stage comprises instruction fetch unit 205 and instruction cache 210. The decode stage comprises instruction decode unit 215. The operand fetch stage comprises register file 220, operand fetch unit 225, and stack cache 230. The execute stage comprises execution unit 235 and data cache 240.

Instruction fetch unit 205 fetches an instruction for execution from instruction cache 210. The decode stage takes the instruction from instruction fetch unit 205 and decodes the instruction in instruction decode unit 215 into a set of signals that can be directly used for executing subsequent pipeline stages. Operand fetch unit 225 fetches required operands from stack cache 230 or data cache 240, or from registers in register file 220. Execution unit 235 in the execute stage performs the actual programmed operation (e.g., add, multiply, divide, and the like) on the operands fetched by the operand fetch stage and generates the result.

As FIG. 2 illustrates, operand fetch unit 225 may fetch data operands from stack cache 230. In order to do so, data processor 106 maintains a section of memory called a stack frame. The stack frame is a segment of continuous memory with a base address and an index address that is used to store temporary data used to execute a subroutine in a program. The stack frame base pointer is an address pointing to the base or root of the stack frame. The index pointer is an offset from the stack frame base pointer to any value on the stack. In the case of an index pointer, the absolute address can be calculated by adding the base pointer and the index pointer. The absolute pointer is a memory address relative to address zero.

Figure 3:
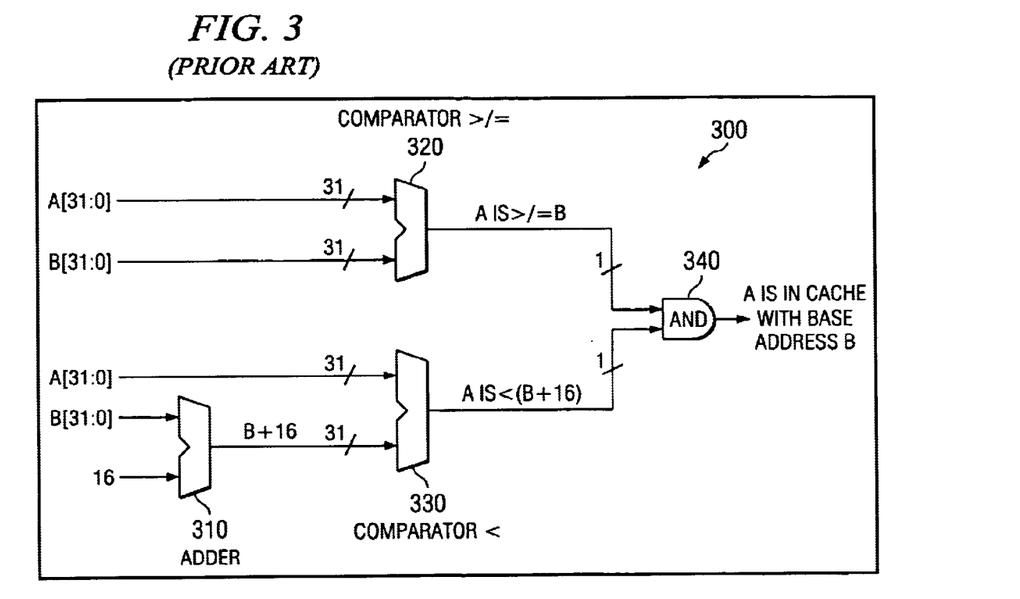
FIG. 3 illustrates an address range checking circuit according to the one embodiment of the prior art.

FIG. 3 illustrates address range checking circuit 300 according to the one embodiment of the prior art. Address range checking circuit 300 comprises adder 310, comparator 320, comparator 330, and AND gate 340. Address range checking circuit 300 is operable to determine if a 32-bit address, A[31:0] is within the range of a sixteen (16) entry stack beginning at the 32-bit base address, B[31:0]. Adder 310 receives all 32 bits, B[31:0], of the base address (i.e., stack frame base pointer) and adds 16 to the base address to generate the output value, (B+16). Comparator 330 compares the 32 bits, A[31:0], of the target address to the (B+16) value. If A[31:0] is less than the (B+16) value, the output of comparator 330, (A IS<(B+16)), is Logic 1. Otherwise, if A[31:0] is greater than or equal to the (B+16) value, (A IS<(B+16)) is Logic 0.

Comparator 320 compares the 32 bits, A[31:0], of the target address to the 32 bits, B[31:0], of the base address. If A[31:0] is greater than or equal to B[31:0], the output of comparator 320, (A IS>/=B), is Logic 1. Otherwise, if A[31:0] is less than B[31:0], (A IS>/=B) is Logic 0. If (A IS>/=B) is Logic 1 and (A IS<(B+16)) also is Logic 1 (meaning A is in the range from B to B+15), then the output of AND gate 340, A IS IN CACHE WITH BASE ADDRESS B, is Logic 1.

Unfortunately, address range checking circuit 300 contains a relatively large and slow adder, namely adder 310. Adder 310 requires a large amount of die space and slows down the speed with which data processor 106 can determine whether or not Address A is in stack cache 230.

The present invention solves the speed and area problem by employing a novel logic to invalidate stack cache 230. The present invention relies on equality comparison logic to gain speed and uses as little other logic as possible in order to minimize the area cost. In the following example illustrating the principles of the present invention, it is assumed that stack cache 230 has a depth of $2^n$. It is further assumed that the address space is 32 bits, and that cache stack 230 has a base address B. Also, it is assumed that n=4 in order to simplify the illustration. The goal is to determine if address A is within cache stack 230.

First, an inequality comparison of the lowest 4 bits is performed. Let:

$A[3:0]\_is\_less\_than\_B[3:0]=A[3:0]<B[3:0]$.

Also, an equality comparison of the highest 28 bits is performed. Let $A\_equal\_B=A[31:4]=B[31:4]$.

Also, a bit-wise Exclusive-OR (X-OR) operation and an AND/OR logic are performed. In the following equations, the operator "~X" means "1s complement of the binary value X", the operator "|" denotes a logical OR operation, the operator "&" denotes a logical AND operation, and the operator "^" denotes a logical Exclusive-OR operation. Let:

$SUM[31:4]=\sim\![A[31:4]\hat{}(\sim\!B[31:4])]$;

$CARRY[31:4]=A[31:4]|\sim\!B[31:4]$; and $A\_equal\_B\_plus\_1=\&\ (SUM[31:4]\hat{}\{CARRY[30:4],1'b0\})$.

Finally, we can determine whether A is in cache with base B using a 2-to-1 multiplexer logic:

If $A[3:0]\_is\_less\_than\_B[3:0]$ $A\_is\_in\_cache\_with\_base\_B=A\_equal\_B\_plus\_1$ Else $A\_is\_in\_cache\_with\_base\_B=A\_equal\_B$.

A stack cache entry now can be invalidated if $A\_is\_in\_cache\_with\_base\_B$ is true, using an index calculated by subtracting $B[3:0]$ from $A[3:0]$.

Assume it is to be determined if address A is within a continuous address range starting with address B and with range width of $2^n$ in a m-bit address space, where n is a small number less than m. In binary format, the addresses are represented as $A[m-1:0]$ and $B[m-1:0]$. Address A and Address B can be divided into two parts, such as $A[m-1:n]$ and $A[n-1:0]$ and $B[m-1:n]$ and $B[n-1:0]$, respectively. The address segment from $\{B[m-1:n],n'b0\}$ to $\{B[m-1:n],n'bff\}$ represent a page of size $2^n$ and the address segment from $\{B[m-1:n]+1,n'b0\}$ to $\{B[m-1]+1:n,n'bff\}$ represents another page. The address $\{B[m-1:n]\}$ is called "page address" and the value $B[n-1:0]$ is the page offset part of the address.

Figure 6:
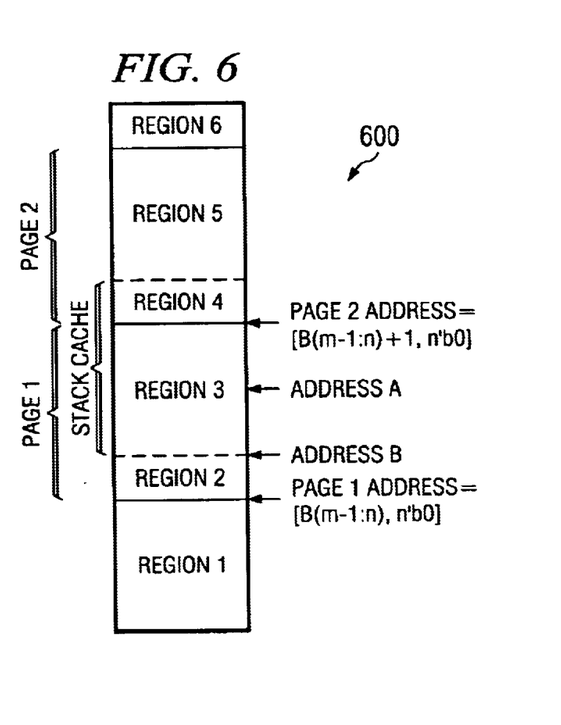
FIG. 6 illustrates various memory pages and regions in which address A may be situated with respect to the stack frame.

A stack cache with base address B and length $2^n$ can be mapped into one full page or two partial adjacent pages if it is not aligned with the page address. Since address A and address B can be any arbitrary numbers, A can be in any of the six (6) regions of the address space, as indicated in FIG. 6. FIG. 6 illustrates different pages and regions in memory in which an address A may be situated with respect to the stack frame.

With equality comparisons of A with the two adjacent B page addresses, we can limit the possibility of A being in the cache to Regions 2, 3, 4 and 5. Furthermore, if we perform an inequality comparison of the page offset of Address A and the page offset of Address B, we can determine exactly which region A is in if it is in the cache at all.

This can be show in the following manner. Let $Comparison1=(A[m-1:n]=B[m-1:n])$;

$Comparison2=(A[m-1:n]=(B[m-1:n]+1))$; and $A\_offset\_is\_less\_than\_B\_offset=(A[n-1:0]<B[n-1:0])$.

If $A\_offset\_is\_less\_than\_B\_offset$ is true, in order for A to be in the cache, Comparison2 must be true. Otherwise, if $A\_offset\_is\_less\_than\_B\_offset$ is false, Comparison1 being true indicates that Address A is in the cache.

Comparison1 is a straight equality comparison, thus it is relatively fast. $A\_offset\_is\_less\_than\_B\_offset$ is fast if n is a small number, which it is for any practical implementation. The only problem is in Comparison2, which includes an addition, or increment, before an equality comparison. However, there is a way to determine Comparison2 without doing an addition. A logic manipulation is required.

In general, assuming A and B are 32-bit binary numbers, if we want to determine $$A=(B+1) \qquad (1)$$

We can perform these transformations:

$A-(B+1)=0$ $A+(\sim\!B)=0$ $A+(\sim\!B)-1=-1$ $$A+(\sim\!B)+32'hffffffff=32'hffffffff \qquad (2)$$

We now do a 3-input carry-save-add (CSA) on the left side of the equation.

If S=Sum and C=Carry, let $S = A\hat{}\,(\sim\!B)\hat{}\,32'hffffffff$ $\phantom{S} = \sim\!(A\hat{}\,(\sim\!B))$, and $C = A\ \&(\sim\!B)\,|\,A\ \&32'hffffffff\,|\,(\sim\!B)\ \&32'hffffffff$ $\phantom{C} = A\,|\,\sim\!B$.

Then equation (2) is equivalent to $S+\{C[31:1],1'b0\ \}=32'hffffffff$

In order for the sum of two binary numbers to be all 1s, one and only one of the numbers has to be one for each bit location, that is $S\hat{}\{C[31:1],1'b0\}==32'hffffffff$ And this is equivalent to $\&(C\hat{}\{C[31:1],1'b0\})$.

Finally we have $A=(B+1)$ is true if and only if $$\&(S\char`\^\{C[31:1],1'b0\})$$

is true. That is the equation used in the solution when A_equal_B_plus_1 was calculated.

Figure 4:
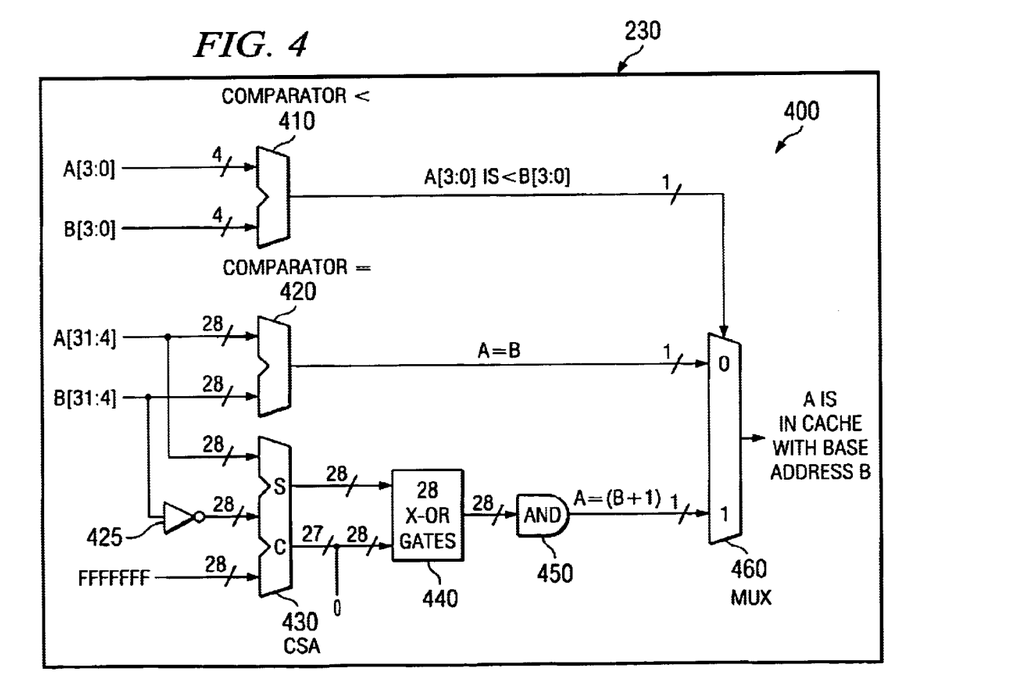
FIG. 4 illustrates an address range checking circuit according to an exemplary embodiment of the present invention.

FIG. 4 illustrates address range checking circuit 400 according to an exemplary embodiment of the present invention. Address range checking circuit 400 comprises comparator 410, comparator 420, inverter block 425, carry-save adder (CSA) block 430, exclusive-OR gates block 440, AND gate 450, and multiplexer 460. Address range checking circuit 400 is operable to determine if a 32-bit address, A[31:0] is within the range of a sixteen (16) entry stack beginning at the 32-bit base address, B[31:0].

Comparator 410 compares the lower four (4) bits, A[3:0], of the target address to the lower four (4) bits, B[3:0], of the base address. If A[3:0] is less than B[3:0], the output of comparator 410, A[3:0]<B[3:0], is Logic 1. Otherwise, if A[3:0] is greater than or equal to B[3:0], the output of comparator 410, A[3:0]<B[3:0], is Logic 0. Comparator 420 compares the upper twenty-eight (28) bits, A[31:4], of the target address to the upper twenty-eight (28) bits, B[31:4], of the base address. If A[31:4] is equal to B[31:4], the output of comparator 420, A=B, is Logic 1. Otherwise, if A[31:4] is less than or greater than B[31:4], the output of comparator 420, A=B, is Logic 0.

Inverter block 425 comprises 28 inverters that invert each bit in the address segment B[31:4] to generate the 1s-complement of B[31:4]. Carry-save adder block 430 receives A[31:4], B[31:4], and 28 Logic 1 bits (i.e., FFFFFFF in hexadecimal). CSA block 430 comprises 28 carry-save adders, each of which receives one bit from A[31:4] on an A input, one bit from the corresponding 1s-complement of B[31:4] on a B input, and one of the 28 Logic 1 bits on a carry-in (CI) input. Each of the 28 carry-save adders generates a Sum (S) bit and a carry-out (CO) bit.

Each of the 28 carry-save adders has the following truth table:

| A | B' | CI | CO | S |
|---|----|----|----|----|
| 0 | 1  | 1  | 1  | 0 |
| 0 | 0  | 1  | 0  | 1 |
| 1 | 1  | 1  | 1  | 1 |
| 1 | 0  | 1  | 1  | 0 |

Thus, if A=0 and B=0 (i.e., B'=1), then the CO bit and the S bit from the CSA are different (i.e., [CO,S]=10). Also, if A=1 and B=1 (i.e., B'=0), then the CO bit and the S bit from the CSA are again different (i.e., [CO,S]=10). Thus, whenever A and B are the same, [CO,S]=10. An exclusive-OR gate can be used to generate a Logic 1 to detect this condition.

However, an exclusive-OR gate would give a false Logic 1 for the case A=0 and B=1 (i.e., B'=0), in which case the CO bit and the S bit from each CSA are still different (i.e., [CO,S]=01). In order to distinguish the case AB=01 from the cases AB=00 and AB=11, the sum from each CSA can be compared to the carry-out from the next lowest order CSA by an exclusive-OR gate. In that case, the exclusive-OR gate receives the S bit from the Kth CSA and the CO bit from the (K−1)th CSA.

This is the case with the 28 exclusive-OR gates in exclusive-OR gates block 440. The first (lowest order) exclusive-OR gate compares a fixed Logic 0 to the S(1) bit from the first CSA. The second exclusive-OR gate compares the CO(1) bit from the first CSA to the S(2) bit from the second CSA. The third exclusive-OR gate compares the CO(2) bit from the second CSA to the S(3) bit from the third CSA, and so forth. In sum, if A=B+1, then the output of exclusive-OR gates block 440 is 28 Logic 1 bits. AND gate 450 outputs a Logic 1 only when all 28 outputs of exclusive-OR gates block 440 are Logic 1 (i.e., when A=B+1).

The output of comparator 410, A[3:0]<B[3:0], is used to control multiplexer 460. When A[3:0]<B[3:0] is Logic 0, the signal A IS IN CACHE WITH BASE ADDRESS B is Logic 1 only if A=B is Logic 1. When A[3:0]<B[3:0] is Logic 0, the signal A IS IN CACHE WITH BASE ADDRESS B is Logic 1 only if A=(B+1) is Logic 1. Thus, the signal A IS IN CACHE WITH BASE ADDRESS B is true only if A[31:4]=B[31:4] and the offset of Address A is greater than or equal to the offset of Address B or if A[31:4]=B[31:4]+1 and the offset of Address A is less than the offset of Address B.

In FIG. 4, carry-save adder block 430 and inverter block 425 may be replaced with a simpler circuit because of the fact that a Logic 1 bit is always added to each of the 28 additions of one of the A[31:4] address bits and one of the B[31:4] address bits. It was noted above that:

$$Sum = A\char`\^(\sim B)\char`\^32'hfffffff.$$

Since the 28 Logic 1 bits are fixed, the Sum value may also be calculated by the following logic:

$$Sum = \sim(A\char`\^(\sim B)).$$

Thus, Sum may be calculated by inverting all twenty-eight of the B[31:4] address bits, exclusive-ORing each of the twenty-eight inverted B[31:4] address bits with a corresponding one of the twenty-eight A[31:4] address bits, and then inverting the twenty-eight outputs of the twenty-eight exclusive-OR gates.

Similarly, it was noted above that $$C = A\&(\sim B)|A\&32'hfffffff|(\sim B)\&32'hfffffff.$$

Since the 28 Logic 1 bits are fixed, the Carry value may also be calculated by the following logic:

$$C = A|\sim B.$$

Thus, Carry may be calculated by inverting all twenty-eight of the B[31:4] address bits, and ORing each of the twenty-eight inverted B[31:4] address bits with a corresponding one of the twenty-eight A[31:4] address bits.

Figure 7:
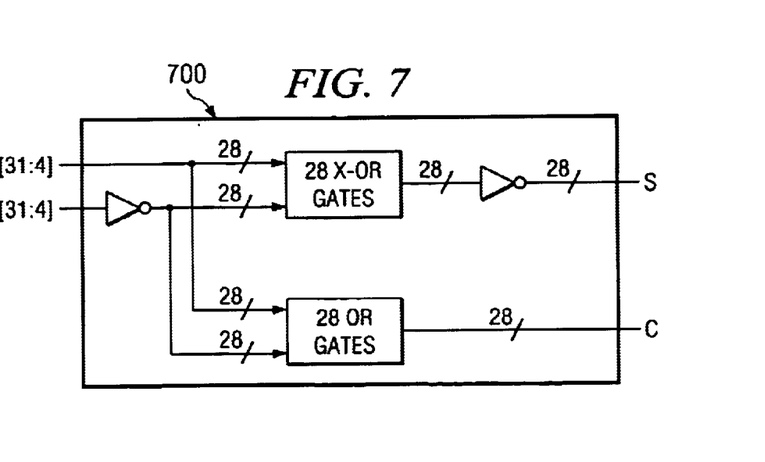
FIG. 7 illustrates an alternative logic circuit used to replace the carry-save adder shown in FIG. 4.

FIG. 7 illustrates alternative logic circuit 700, which replaces carry-save adder block 430 and inverter block 425 in FIG. 4.

The above-described methods of determining whether an address is within a stack cache range are different from the method that employs an inequality comparator to compare all address bits. It uses one inequality comparison only on a small number of bits and relies on equality comparison logic to determine the cache hit. The present invention saves valuable silicon area and gets much better speed performance compared to other approaches. In an implementation using 0.18 mm technology and a cache depth of 16, the present invention saves 40% of active silicon area and is 37% faster than the full inequality comparison approach.

Although the present invention has been described in detail, those skilled in the art should understand that they can make various changes, substitutions and alterations herein without departing from the spirit and scope of the invention in its broadest form.

What is claimed is:

1. An address range checking circuit capable of determining if a target address A[M:0] is within an address space having $2^N$ address locations beginning at a base address location, B[M:0], said address range checking circuit comprising:

comparison circuitry capable of determining if the address segment A[N−1:0] is less than the address segment B[N−1:0] and generating on an output a first control signal having a first logic state indicating A[N−1:0] is less than B[N−1:0] and having a second logic state indicating A[N−1:0] is not less than B[N−1:0];

first equivalence detection circuitry capable of determining if the address segment A[M:N] is equal to the address segment B[M:N] and generating on an output an A=B status signal having a first logic state indicating A[M:N] is equal to B[M:N] and having a second logic state indicating A[M:N] is not equal to B[M:N];

second equivalence detection circuitry capable of determining if the address segment A[M:N] is equal to the address segment B[M:N] plus one and generating on an output an A=B+1 status signal having a first logic state indicating A[M:N] is equal to B[M:N] plus one and having a second logic state indicating A[M:N] is not equal to B[M:N] plus one; and a multiplexer controlled by said first control signal generated by said comparison circuitry, said multiplexer having a first input coupled to said first equivalence detection circuitry output and a second input coupled to said second equivalence detection circuitry output, wherein said first control signal causes said multiplexer to output said A=B status signal when said first control signal is at said second logic state indicating A[N−1:0] is not less than B[N−1:0] and causes said multiplexer to output said A=B+1 status signal when said first control signal is at said first logic state indicating A[N−1:0] is less than B[N−1:0].

2. The address range checking circuit as set forth in claim 1 wherein said second equivalence detection circuitry comprises M−N+1 inverters, each of said M−N+1 inverters receiving and inverting one of the address bits in the address segment B[M:N].

3. The address range checking circuit as set forth in claim 2 wherein said second equivalence detection circuitry further comprises M−N+1 carry-save adders, each of said M−N+1 carry-save adders having a first input for receiving one of the address bits in the address segment A[M:N], A, a second input for receiving a corresponding one of the inverted B[M:N] address bits, B', and a carry-in (CI) input for receiving a carry-in value equal to 1, and wherein each of said M−N+1 carry-save adders generates a sum (S) output and a carry-out (CO) output, such that each of the M−N+1 carry-save adders has the following truth table:

| A | B' | CI | CO | S |
|---|----|----|----|----|
| 0 | 1  | 1  | 1  | 0 |
| 0 | 0  | 1  | 0  | 1 |
| 1 | 1  | 1  | 1  | 1 |
| 1 | 0  | 1  | 1  | 0 |

4. The address range checking circuit as set forth in claim 3 wherein said second equivalence detection circuitry further comprises M−N+1 exclusive-OR gates, wherein each of the M−N most significant exclusive-OR gates has a first input coupled to the sum output of the Kth one of the M−N most significant carry-save adders and has a second input coupled to the carry-out output of the (K−1)th one of the M−N most significant carry-save adders and wherein the least significant exclusive-OR gate has a first input coupled to the sum output of the least significant carry-save adder and a second input coupled to a Logic 0.

5. The address range checking circuit as set forth in claim 4 wherein said second equivalence detection circuitry further comprises an AND gate having M−N+1 inputs, each of the M−N+1 AND gate inputs coupled to one of the M−N+1 outputs of the M−N+1 exclusive-OR gates, wherein an output of the AND gate comprises said A=B+1 status signal.

6. The address range checking circuit as set forth in claim 1 wherein M is much larger than N.

7. The address range checking circuit as set forth in claim 6 wherein M is at least 15 and N is less than 8.

8. The address range checking circuit as set forth in claim 6 wherein M is at least 31 and N is less than 8.

9. The address range checking circuit as set forth in claim 8 wherein N is less than 6.

10. A data processor comprising:

a stack cache having $2^N$ address locations beginning at a base address location, B[M:0], for storing data values being processed by said data processor; and an address range checking circuit capable of determining if a target address A[M:0] is within said stack cache, said address range checking circuit comprising:

comparison circuitry capable of determining if the address segment A[N−1:0] is less than the address segment B[N−1:0] and generating on an output a first control signal having a first logic state indicating A[N−1:0] is less than B[N−1:0] and having a second logic state indicating A[N−1:0] is not less than B[N−1:0];

first equivalence detection circuitry capable of determining if the address segment A[M:N] is equal to the address segment B[M:N] and generating on an output an A=B status signal having a first logic state indicating A[M:N] is equal to B[M:N] and having a second logic state indicating A[M:N] is not equal to B[M:N];

second equivalence detection circuitry capable of determining if the address segment A[M:N] is equal to the address segment B[M:N] plus one and generating on an output an A=B+1 status signal having a first logic state indicating A[M:N] is equal to B[M:N] plus one and having a second logic state indicating A[M:N] is not equal to B[M:N] plus one; and a multiplexer controlled by said first control signal generated by said comparison circuitry, said multiplexer having a first input coupled to said first equivalence detection circuitry output and a second input coupled to said second equivalence detection circuitry output, wherein said first control signal causes said multiplexer to output said A=B status signal when said first control signal is at said second logic state indicating A[N−1:0] is not less than B[N−1:0] and causes said multiplexer to output said A=B+1 status signal when said first control signal is at said first logic state indicating A[N−1:0] is less than B[N−1:0].

11. The data processor as set forth in claim 10 wherein said second equivalence detection circuitry comprises M−N+1 inverters, each of said M−N+1 inverters receiving and inverting one of the address bits in the address segment B[M:N].

12. The data processor as set forth in claim 11 wherein said second equivalence detection circuitry further comprises M−N+1 carry-save adders, each of said M−N+1 carry-save adders having a first input for receiving one of the address bits in the address segment A[M:N], A, a second input for receiving a corresponding one of the inverted B[M:N] address bits, B', and a carry-in (CI) input for receiving a carry-in value equal to 1, and wherein each of said M−N+1 carry-save adders generates a sum (S) output and a carry-out (CO) output, such that each of the M−N+1 carry-save adders has the following truth table:

| A | B' | CI | CO | S |
|---|----|----|----|---|
| 0 | 1  | 1  | 1  | 0 |
| 0 | 0  | 1  | 0  | 1 |
| 1 | 1  | 1  | 1  | 1 |
| 1 | 0  | 1  | 1  | 0 |

13. The data processor as set forth in claim 12 wherein said second equivalence detection circuitry further comprises M−N+1 exclusive-OR gates, wherein each of the M−N most significant exclusive-OR gates has a first input coupled to the sum output of the Kth one of the M−N most significant carry-save adders and has a second input coupled to the carry-out output of the (K−1)th one of the M−N most significant carry-save adders and wherein the least significant exclusive-OR gate has a first input coupled to the sum output of the least significant carry-save adder and a second input coupled to a Logic 0.

14. The data processor as set forth in claim 13 wherein said second equivalence detection circuitry further comprises an AND gate having M−N+1 inputs, each of the M−N+1 AND gate inputs coupled to one of the M−N+1 outputs of the M−N+1 exclusive-OR gates, wherein an output of the AND gate comprises said A=B+1 status signal.

15. The data processor as set forth in claim 10 wherein M is much larger than N.

16. The data processor as set forth in claim 15 wherein M is at least 15 and N is less than 8.

17. The data processor as set forth in claim 15 wherein M is at least 31 and N is less than 8.

18. The data processor as set forth in claim 17 wherein N is less than 6.

19. A method of determining if a target address A[M:0] is within an address space having $2^N$ address locations beginning at a base address location, B[M:0], the method comprising the steps of:

determining if the address segment A[N−1:0] is less than the address segment B[N−1:0] and generating a first control signal having a first logic state indicating A[N−1:0] is less than B[N−1:0] and having a second logic state indicating A[N−1:0] is not less than B[N−1:0];

determining if the address segment A[M:N] is equal to the address segment B[M:N] and generating an A=B status signal having a first logic state indicating A[M:N] is equal to B[M:N] and having a second logic state indicating A[M:N] is not equal to B[M:N];

determining if the address segment A[M:N] is equal to the address segment B[M:N] plus one and generating an A=B+1 status signal having a first logic state indicating A[M:N] is equal to B[M:N] plus one and having a second logic state indicating A[M:N] is not equal to B[M:N] plus one;

if the first control signal is at the second logic state indicating A[N−1:0] is not less than B[N−1:0], selecting the A=B status signal, wherein the A=B status signal having the first logic state indicates that the target address A[M:0] is within an address space having $2^N$ address locations; and if the first control signal is at the first logic state indicating A[N−1:0] is less than B[N−1:0], selecting the A=B+1 status signal, wherein the A=B+1 status signal having the first logic state indicates that the target address A[M:0] is within an address space having $2^N$ address locations.

20. The method as set forth in claim 19 wherein M is much larger than N.

21. The method as set forth in claim 20 wherein M is at least 15 and N is less than 8.

22. The method as set forth in claim 20 wherein M is at least 31 and N is less than 8.

23. The method as set forth in claim 22 wherein N is less than 6.

* * * * *